(No Model.)
W. S. REAGAN.
AUTOMATIC CUT-OFF FOR WATER TROUGHS.
No. 477,226. Patented June 21, 1892.
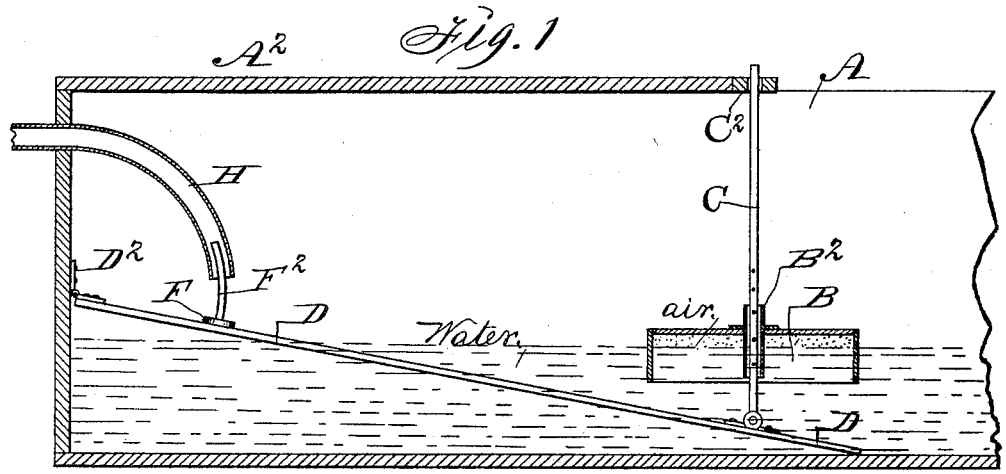
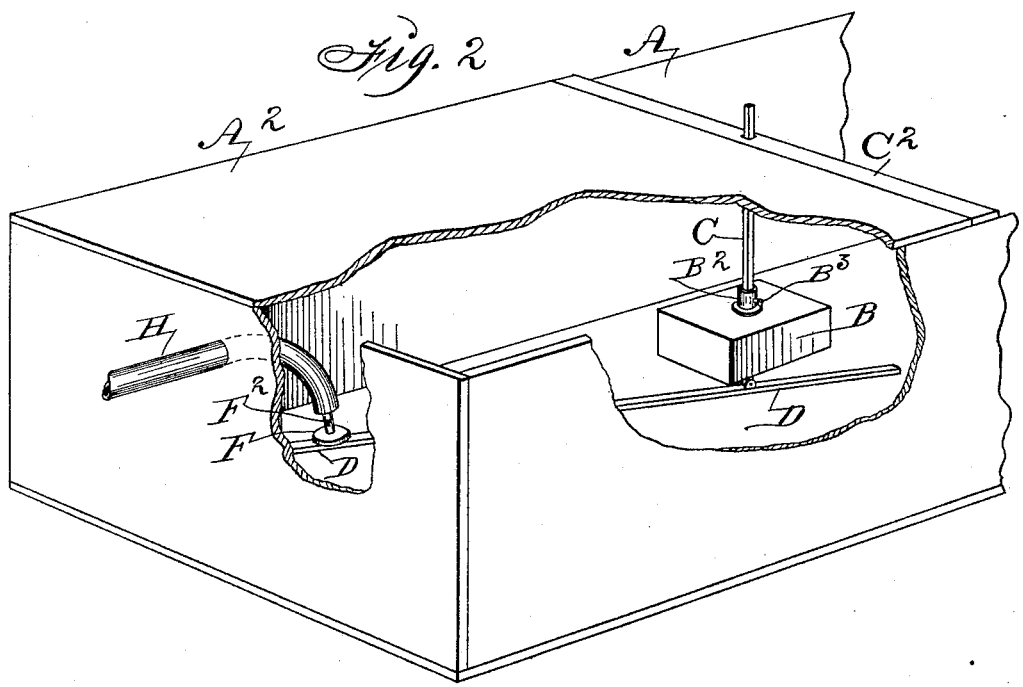

WILLIAM S. REAGAN, OF MYRA, KANSAS.

AUTOMATIC CUT-OFF FOR WATER-TROUGHS.

SPECIFICATION forming part of Letters Patent No. 477,226, dated June 21, 1892.

Application filed May 15, 1891. Serial No. 392,928. (No model.)

*To all whom it may concern:*

Be it known that I, WILLIAM S. REAGAN, a citizen of the United States of America, and a resident of Myra, in the county of Woodson and State of Kansas, have invented an Improvement in Automatic Cut-Offs for Water-Troughs, of which the following is a specification.

My invention consists in the arrangement and combination of a float and a post with a lever and a trough, and a valve with the same lever, a supply-pipe, and a trough, as hereinafter set forth, pointed out in my claim, and illustrated in the accompanying drawings, in which—

Figure 1 is a longitudinal sectional view, and Fig. 2 a perspective view, of the device, showing the operative parts in position as required for practical use.

A represents a wooden stock-watering trough of common form having a lid or covering $A^2$ over that portion which contains the operative mechanism in order to protect it from breakage or displacement by the animals using said trough.

B represents a float in the trough A, consisting of a box closed at its top and open on its under side and having in its center a sleeve $B^2$, open at both ends and fixed to the top of the float B, as required, to form an air-tight chamber therein when the under side of said float is closed by the water in the trough. The sleeve $B^2$ is adapted to encircle a post, and it has perforations through its top adapted to admit a pin $B^3$.

C is a post or bar hinged at its bottom to the free end of a lever and at its top is adapted to pass through an opening in a cross-bar or brace $C^2$, fixed on the top of the trough A. It has along its center a series of perforations or bores adapted to admit the pin $B^3$, as required, to adjustably connect the float B therewith by passing the pin through the top of the sleeve $C^2$.

D is a lever of the second order, having its fulcrum in a hinge $D^2$, which is attached to the end of a trough $C'$. To its free end is hinged the post C to adapt it to operate a cut-off valve.

F is a valve consisting of a rubber disk and a curved projecting part $F^2$, adapted to enter the supply-pipe H and to keep the valve in its proper position relative to the supply-pipe, so that the rubber disk is adapted to engage with the mouth of the supply-pipe H and to stop the flow of water therefrom when the lever D upon which it is fixed is raised.

In the practical use of my invention water passing through the supply-pipe H into the trough when it has attained the height to which the float B is adjusted on the post or bar C will then compress the air contained in the float, which on account of its great elasticity aids in raising the float B and the lever D attached thereto until the valve F comes in contact with the mouth of the supply-pipe H and thereby automatically stops the flow of water into the trough or one or more auxiliary troughs connected with the main trough.

What I claim as my invention, and desire to secure by Letters Patent, is—

An automatic stock-watering device consisting of a trough, a lever hinged to the inside of one end of the trough to extend toward the other end, a post hinged to the free-end portion of the lever to project up through a cross-piece fixed to the trough, a float having an open bottom and a closed top and an open-ended sleeve in its center adapted to slide on the post and to be detachably fixed to the post, a valve fixed on top of the lever and provided with a curved projection that extends into the open curved end of a supply-pipe that terminates in the trough, all arranged and combined to operate in the manner set forth, for the purposes stated.

WILLIAM S. REAGAN.

Witnesses:
C. C. CLEVINGER,
OLIVER EAGLE.